United States Patent [19]
Lancaster

[11] Patent Number: 5,791,618
[45] Date of Patent: Aug. 11, 1998

[54] CONTAINER HOLDER

[75] Inventor: Kelly A. Lancaster, Wyoming, Mich.

[73] Assignee: Lescoa, Inc., Grand Rapids, Mich.

[21] Appl. No.: 758,237

[22] Filed: Nov. 27, 1996

Related U.S. Application Data

[60] Provisional application No. 60/008,575 Dec. 12, 1995.

[51] Int. Cl.$^6$ .................................................. A47K 1/08
[52] U.S. Cl. ................................. 248/311.2; 224/926
[58] Field of Search .......................... 248/311.2, 313, 248/316.3, 526; 224/926

[56] References Cited

U.S. PATENT DOCUMENTS

| | | | |
|---|---|---|---|
| 4,511,072 | 4/1985 | Owens | 224/549 |
| 4,783,037 | 11/1988 | Flowerday | 248/311.2 |
| 4,828,211 | 5/1989 | McConnell et al. | 248/311.2 |
| 4,892,281 | 1/1990 | DiFilippo et al. | 248/311.2 |
| 4,943,111 | 7/1990 | VanderLaan | 248/311.2 X |
| 4,953,771 | 9/1990 | Fischer et al. | 224/549 |
| 4,981,277 | 1/1991 | Elwell | 248/311.2 |
| 5,007,610 | 4/1991 | Christiansen et al. | 248/311.2 |
| 5,024,411 | 6/1991 | Elwell | 248/311.2 |
| 5,072,989 | 12/1991 | Spykerman et al. | 297/188.16 |
| 5,087,008 | 2/1992 | Miller et al. | 248/311.2 |
| 5,096,152 | 3/1992 | Christiensen et al. | 248/311.2 |
| 5,104,184 | 4/1992 | Kwasnik et al. | 248/311.2 X |
| 5,131,716 | 7/1992 | Kwasnik et al. | 248/311.2 X |
| 5,143,338 | 9/1992 | Eberlin | 248/313 |
| 5,171,061 | 12/1992 | Marcusen | 248/311.2 X |
| 5,190,259 | 3/1993 | Okazaki | 248/311.2 |
| 5,219,140 | 6/1993 | Spykerman | 248/311.2 |
| 5,259,580 | 11/1993 | Anderson et al. | 248/311.2 |
| 5,284,314 | 2/1994 | Misaras et al. | 248/311.2 |
| 5,289,962 | 3/1994 | Tull et al. | 248/311.2 X |
| 5,330,146 | 7/1994 | Spykerman | 248/311.2 |
| 5,390,887 | 2/1995 | Campbell | 248/311.2 |
| 5,398,898 | 3/1995 | Bever | 248/311.2 |
| 5,527,008 | 6/1996 | Schutter et al. | 248/311.2 |
| 5,560,578 | 10/1996 | Schenken et al. | 248/313 |
| 5,634,621 | 6/1997 | Jankovic | 248/311.2 |

Primary Examiner—Ramon O. Ramirez
Attorney, Agent, or Firm—Rader, Fishman, Grauer & McGarry

[57] ABSTRACT

A container holder adapted to be mounted within a vehicle interior compartment is provided comprising a housing which mounts at least one pivotable arm having a sector-like floor portion. The arm is pivotable between a retracted and an extended position. As a beverage container is placed within the housing, a base portion of the beverage container pivots the at least one arm about an axis which causes the arm to pivot to the extended position and to engage a wall portion of the beverage container. The beverage container is thereby retained in the housing in a stable manner. A release button assembly is provided which returns the arm to the retracted position when the beverage container is removed.

13 Claims, 3 Drawing Sheets

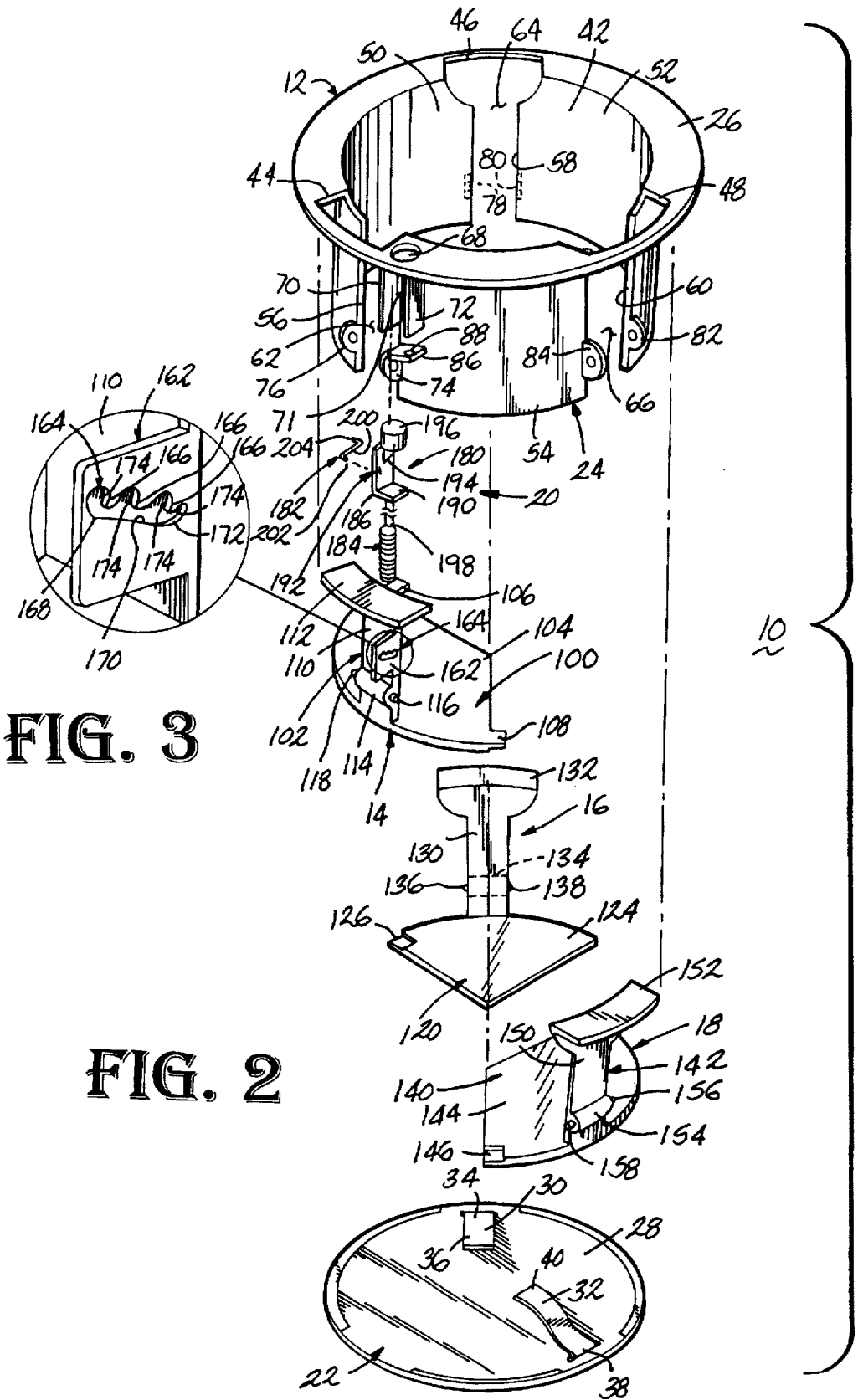

1

CONTAINER HOLDER

CLAIM OF PRIORITY

This application claims priority pursuant to 35 U.S.C. § 119 of U.S. provisional patent application Ser. No. 60/008,515, filed Dec. 12, 1995.

BACKGROUND OF THE INVENTION

1. Field of the Invention

This invention relates to a container holder, and more specifically to an adjustable container holder for receiving containers of varying sizes.

2. Description of Related Art

Container holders in an automobile are commonplace in contemporary vehicles. The container holders are used to store a beverage container so that the vehicle operator can operate the vehicle without concern over the spilling of the container. Consequently, a number of devices have been developed for retaining and supporting beverage containers used in automobiles.

Several prior patents disclose trays which may be slidably mounted below an automobile dashboard for movement between a retracted storage position below the dashboard and an extended position of use above or close to the leading edge of the front passenger seat. Such trays may be provided with fixed circular apertures for receiving beverage containers. Examples of these devices are disclosed in U.S. Pat. No. 2,825,611, issued Mar. 4, 1958, U.S. Pat. No. 3,606,112, issued Sep. 20, 1971, and U.S. Pat. No. 3,899,982, issued Aug. 19, 1975.

Other references disclose trays which may be swingably mounted below an automobile dashboard for movement between a storage position below the dashboard and position of use extending from the dashboard toward the seat. These trays also may be provided with fixed circular apertures for receiving beverage containers. Examples of the latter devices are disclosed in U.S. Pat. No. 3,772,934, issued Dec. 4, 1956, and U.S. Pat. No. 3,190,241, issued Jun. 22, 1965.

These prior art devices which provide specific means for supporting and retaining beverage containers disclose trays having complete and fixed circular apertures arranged in a side-by-side or front-to-back relation. This necessarily requires that the width or depth, respectively, of the tray be greater than the diameter of two beverage containers to allow enough area to enclose a pair of fixed, complete circular apertures. Such devices obviously occupy considerable space below the vehicle dashboard.

More recent container holders disclose a drawer or tray slidably mounted within the dashboard or console of the vehicle. The drawer or tray has semicircular openings forming a portion of a cup receiving area and arcuate arms completing the cup receiving area. Many of these container holders disclose arms which are biased inwardly toward the drawer and which can be moved outwardly from an initial minimum position to an enlarged position to receive a cup of larger diameter than the cup receiving area. Examples of these cup holders are U.S. Pat. No. 5,259,580, issued Nov. 9, 1993 and U.S. Pat. No. 4,953,771, issued Sep. 4, 1990.

Similarly, other cup holders have a cup receiving area formed by a body portion having semicircular openings and an arm which is biased to a closed or retracted position. These cup holders are expandable from a minimum size to a larger size by forcing the cup into the cup receiving area and moving the arm opposite the direction that it is biased. See U.S. Pat. No. 5,131,716, issued Jul. 21, 1992, U.S. Pat. No. 5,104,184, issued Apr. 14, 1992, and U.S. Pat. No. 5,190,259, issued Mar. 2, 1993. However, these cup holders are difficult and unsafe to use because they often require the use of both hands when the cup is larger than the minimum cup holder size. One hand is used to expand the cup holder and the other hand is used to place the cup in the expanded cup holder.

One solution to these problems is presented in U.S. Pat. No. 5,527,008, issued Jun. 18, 1996, which discloses a container holder including a arm which is pivotable to one of several discrete positions through a ratchet-type detent mechanism. However, the user is still required to use at least one hand to position the arm.

SUMMARY OF THE INVENTION

The invention improves the art of adjustable cup holders by providing an adjustable container holder which automatically engages a wall of a beverage container with multiple arms as the beverage container is placed within the container holder according to the invention. Thus, the vehicle operator needs only to place the beverage container in the container holder to ensure a stable retention therein and is not required to use any of the operator's hands to position any components of the container holder. The weight of the beverage container causes the arms to pivot toward the beverage container.

In one aspect of the invention, the container holder comprises a housing having multiple arms each of which comprises a base portion and an upwardly extending flange. The arms are each movably mounted to the housing for movement between a retracted position and an extended position and together at least partially define a container-receiving well. At least one spring biases at least one of the arms to the retracted position. The tension in the spring being selected so that the weight of a container positioned in the container-receiving well overcomes the bias of the spring to move the arms from the retracted position toward the extended position.

The container holder can further comprise a detent mechanism located between the housing and at least one of the multiple arms which is adapted to selectively retain the arms in the extended position regardless of whether a container is positioned in or removed from the container-receiving well.

The container holder can also comprise an actuator link movable between a first and a second position which is mounted either to the housing or to at least one of the arms and is operably connected to the detent mechanism so that movement of the actuator link to the second position selectively disengages the detent mechanism from either the housing or the arm. The actuator link can comprise a button movably mounted to a flange on the housing which is biased into the first position by a spring whereby pressing the button moves the actuator link toward the second position to selectively disengage the detent mechanism from either the housing or the at least one arm.

The housing and the arms of the container holder can each define an interior surface whereby the interior surfaces of the arms are flush with the interior surface of the housing when the arms are in the retracted position. The base portions of the arms can have linkages to connect the base portions for movement together. Further, the base portions and the upwardly-extending flanges of the arms can be joined together for movement as a unit. The housing can include cylindrical wall portions. The housing can further include an annular lip joined to an upper portion of the cylindrical wall portions. The base portions of the multiple arms can each comprise a circular sector which can further form a circular support plate when the arms are in the retracted position.

The arms can be pivotably mounted to a side wall of the housing by mounting flanges with aligned openings on the side walls of the housing and an integral journal formed on each of the arms whereby the integral journals each snap-fit into the aligned openings.

BRIEF DESCRIPTION OF THE DRAWINGS

The invention will now be described with reference to the drawings wherein:

FIG. 2 is an exploded view of the container holder of FIG. 1;

FIG. 3 is a perspective view of the container holder of FIG. 1 enlarging the region shown in FIG. 2;

DESCRIPTION OF THE PREFERRED EMBODIMENTS

Figure 1:
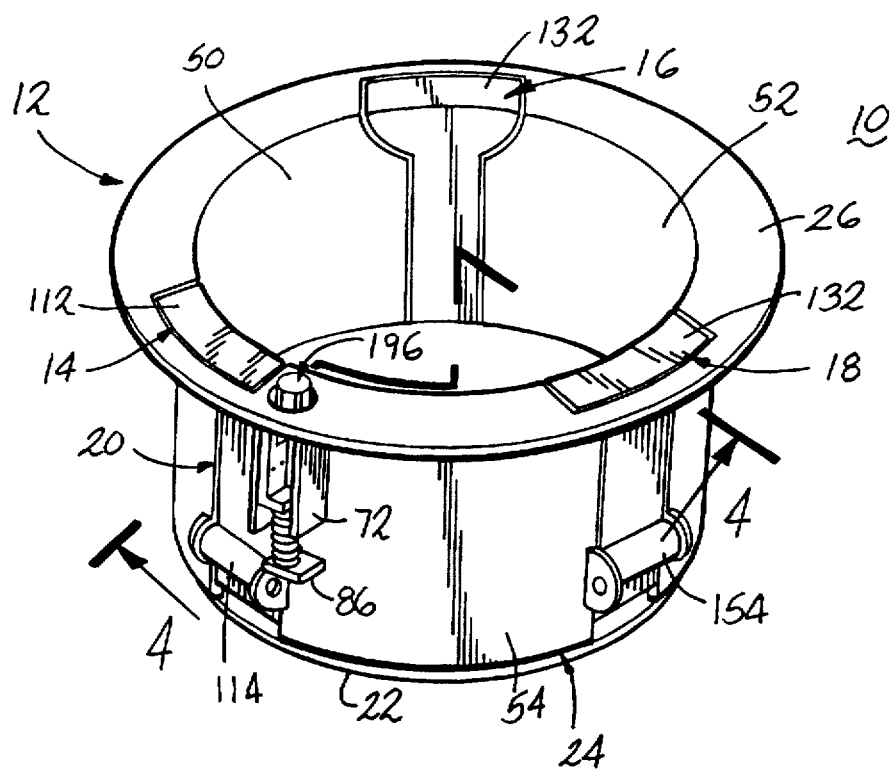
FIG. 1 is a perspective view of the container holder according to the invention in a retracted position.
Figure 4:
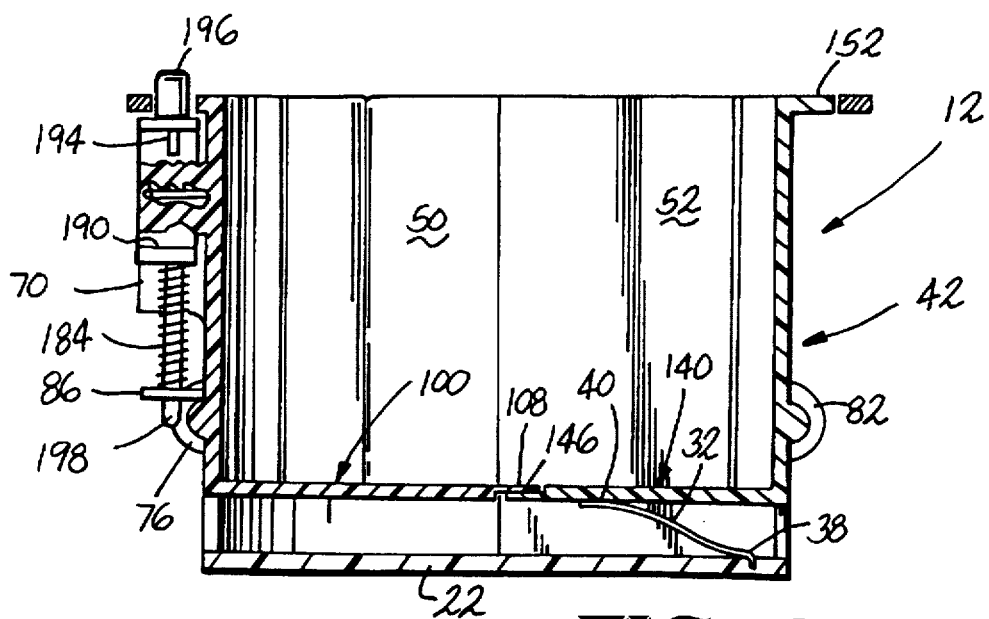
FIG. 4 is a cross-sectional view of the container holder in a retracted position taken along lines 4—4 of FIG. 1.

Referring now to the drawings and to FIGS. 1–3 in particular, a container holder 10 is shown comprising a housing 12, first, second and third pivotable arms 14, 16 and 18, respectively, and a button assembly 20. The container holder 10 is constructed from a rigid plastic or metal material for installation within a passenger compartment of an automobile, mobile home, van or any other suitable location within a passenger vehicle requiring a sturdy retention means for a beverage container.

The housing 12 comprises a base 22, vertical wall 24 and an upper lip 26. The base 22 comprises a round disc 28 having first and second leaf springs 30 and 32, respectively, spaced approximately 120° apart. The first leaf spring 30 is mounted at its distal end 34 adjacent the circumferential edge of the disc 28 and extends radially inwardly such that the proximal end 36 points toward the center of the disc 28. The proximal end 36 of the first leaf spring 30 is upwardly biased with respect to the disc 28. The second leaf spring 32 is disposed in spaced relationship to the first leaf spring 30 and similarly includes a mounted distal end 38 and an upwardly-biased proximal end 40. The vertical wall 24 comprises a cylindrical shell 42 mounted to the circumferential edge of the disc 28 extending upwardly therefrom and terminating in the outwardly radially-extending annular upper lip 26. The vertical wall 24 is divided into three equal-sized portions 50, 52 and 54 disposed in spaced circumferential relationship such that rectangular recesses 56, 58 and 60 are disposed between each of the wall portions 50, 52 and 54. The upper lip 26 includes three equidistant rectangular indentations 44, 46 and 48 extending inwardly from the inner edge of the annular lip 26. The recesses 56, 58 and 60 each share a common central vertical axis with the respective indentations 44, 46 and 48 disposed along the upper annular lip 26 such that the indentation 44 and recess 56, indentation 46 and recess 58, and indentation 48 and recess 60 define pivotable arm receiving areas 62, 64 and 66, respectively. A circular aperture 68 is disposed in the upper annular lip 26 adjacent the indentation 44. First and second rectangular guide flanges 70 and 72, respectively, are disposed in spaced parallel relationship adjacent outward tangential edges of the aperture 68. The first and second guide flanges 70 and 72 each comprise an outwardly radially-extending rectangular component mounted at an inward vertical edge to the wall portion 54. The first guide flange 70 includes a vertical slot-like aperture 71 disposed within a central portion of the flange 70. The pivotable arm receiving area 62 includes a pair of mounting flanges 74 and 76 disposed a short distance above the bottom edge of the adjacent wall portions 50 and 54, respectively. Each mounting flange 74 and 76 comprises an outwardly-extending semi-circular flange having a central aperture disposed horizontally therethrough. Pivotable arm receiving areas 64 and 66 include similarly located mounting flanges 78 and 80, and 82 and 84, respectively. Further, the mounting flange 74 includes a horizontal flange 86 mounted at its inward edge to wall portion 54 adjacent the upward portion of mounting flange 74 and has a vertical circular aperture 88 in concentric vertical alignment with the aperture 68 in the upper annular lip 26.

The first pivotable arm 14 comprises a base 100 and an upwardly-extending flange 102. The base 100 comprises a pie-shaped wedge 104 spanning approximately 120° and including first and second flanges 106 and 108 formed by circumferential extensions of the wedge 104 and extending outwardly only from the upper one-half thickness of the wedge 104. The flange 102 comprises an upwardly-extending rectangular flange 110 and further includes a horizontal flange 112 extending laterally from the upper edge of the flange 110. The horizontal flange 112 is received by the recess 44 in the upper annular lip 26. A semi-cylindrical flange 114 extends transversely across the flange 110 a short distance above the lower edge of the flange 110 and includes cylindrical axial projections 116 and 118.

The second pivotable arm 16 comprises a base 120 and an upwardly-extending flange 122. The base 120 comprises a pie-shaped wedge 124 spanning approximately 120° and including a rectangular indentation 126 disposed at one circumferential edge of the wedge 124, extending downwardly approximately one-half thickness of the wedge 124. The flange 122 comprises an upwardly-extending rectangular flange 130 corresponding in width to the recess 58 and further including a horizontal laterally-extending flange 132 mounted to the upper edge of the flange 130. The horizontal flange 132 is received by the recess 46 in the upper annular lip 26. A semi-cylindrical flange 134 extends transversely across the flange 130 a short distance above the lower edge of the flange 130 and includes cylindrical axial projections 136 and 138.

The third pivotable arm 18 comprises a base 140 and an upwardly-extending flange 142. The base 140 comprises a pie-shaped wedge 144 spanning approximately 120° and including a rectangular indentation 146 disposed at one circumferential edge of the wedge 144, extending downwardly approximately one-half thickness of the wedge 144. The flange 142 comprises an upwardly-extending rectangular flange 150 corresponding in width to the recess 60 and further including a horizontal flange 152 mounted to the upper edge of the flange 150. The horizontal flange 152 is adapted to be received by the recess 48 in the upper annular lip 26. A semi-cylindrical flange 154 extends transversely across the flange 150 a short distance above the lower edge of the flange 150 and includes cylindrical axial projections 156 and 158.

Referring to FIG. 2 and in greater detail to FIG. 3, the rectangular flange 110 on the first pivotable arm 14 further includes an outwardly-extending flange 162 comprising a rectangular component having an angular recess 164. The recess 164 is defined by several teeth 166, the last of which extends into a rounded trailing edge 168. The trailing edge 168 extends into an angular wall 170 and further into a rounded leading edge 172 which, in turn, extends into the first tooth 166. The areas between the teeth 166, between the last tooth 166 and the trailing edge 168, and between the leading edge 172 and the first tooth 166 define several upward angularly-extending channels 174.

The button assembly 20 comprises a button flange 180, a pin 182 and a spring 184 which acts as a detent mechanism to constrain the pivotable motion of the arms. The button flange 180 comprises an L-shaped bracket 186 having a vertical portion 188 and a horizontal portion 190. The vertical portion 188 includes a horizontal semi-cylindrical groove 192 extending across a rear side of the horizontal portion 188 and a right triangular support flange 194 outwardly disposed at an upper portion of the vertical portion 188 and having a cylindrical button 196 mounted to the upper edges of the vertical portion 188 and the triangular flange 194. The horizontal portion 190 extends outwardly from the lower edge of the vertical portion 188 and includes a cylindrical rod 198 vertically mounted to the underside of the horizontal portion 190 and aligned with the center thereof. The pin 182 comprises a rod 200 having a rearwardly-extending stud 202 at one end and a forwardly-extending pin 204 at its opposite end. The stud 202 is mounted adjacent a vertical edge of the vertical portion 188 of the L-shaped bracket 186 such that the rod 200 lies in the horizontal groove 192 of the vertical portion 188 of the L-shaped bracket 186 and the pin 204 extends rearwardly adjacent the opposite vertical edge of the vertical portion 188. Alternatively, the L-shaped bracket 186 can be integrally molded with the pin 204 extending outwardly from the vertical portion 188. The spring 184 is a conventional coil spring which can be inserted axially over the rod 198 extending from the underside of the horizontal portion 190 of the L-shaped bracket 186. The forwardly extending pin 204 extends into the angular recess 164 for releasable engagement with teeth 166.

To assemble the container holder 10, the second pivotable arm 16 is pivotably mounted to the vertical wall 24 of the housing 12 by snap-fitting projection 136 into the central aperture of the mounting flange 78 and projection 138 into the central aperture of the mounting flange 80 such that the arm 16 is received within the pivotable arm receiving area 64. The third pivotable arm 18 is pivotably mounted to the vertical wall 24 by snap-fitting projection 156 into the central aperture of the mounting flange 82 and projection 158 into the central aperture of the mounting flange 84 such that the arm 18 is received within the pivotable arm receiving area 66. The first pivotable arm 14 is then pivotably mounted to the vertical wall 24 in similar fashion by snap-fitting projection 116 into the central aperture of mounting flange 74 and snap-fitting projection 118 into the central aperture of mounting flange 76. The angular recess 164 of the flange 162 on the first pivotable arm 14 is aligned with the vertical slot 71 of the first guide flange 70. When the mounting of the three pivotable arms 14, 16, and 18 is complete, the outwardly-extending flanges 106 and 108 of the first pivotable arm 14 are received by the indentations 126 and 146 of the second and third pivotable arms 16 and 18, respectively. The leaf springs 30 and 32 mounted to the base 22 of the housing 12 provide an upward bias to the bases 120 and 140 of the second and third pivotable arms 16 and 18, respectively. The button 196 of the button assembly 20 is then inserted within the aperture 68 from the underside of the annular lip 26. The L-shaped bracket 186 of the button assembly 20 can then be brought into position such that the vertical portion 188 rests against the interior surface of the first guide flange 70 and the pin 204 extends laterally therefrom, through the vertical slot 71 in the first guide flange 70, and into the angular recess 164 of the flange 162. In order to vertically slidably mount the button assembly 20, the bottom portion of the rod 198 must be urged into the aperture 88 in the horizontal flange 86, locating the spring 184 between the underside of the horizontal portion 190 of the L-shaped bracket 186 and the upper surface of the horizontal flange 86. The spring 184 thus provides an upward bias to the button assembly 20 with respect to the flange 86.

The movement of the button assembly 20 is limited to slidable vertical travel by the first and second guide flanges 70 and 72, respectively, and the rod 198 within the aperture 88. The upward bias of the first and second leaf springs 30 and 32, respectively, urges the bases 120 and 140 of the second and third pivotable arms 16 and 18 upwardly. The first pivotable arm 14 is thereby biased upwardly due to the contact between the flanges 106 and 108 which rest within the indentations 126 and 146. The first, second, and third pivotable arms 14, 16, and 18 are thereby pivoted upwardly and outwardly about an axis of each respective set of projections 116, 118; 136, 138; and 156, 158 to the retracted position shown in the perspective view of FIG. 1. When the container holder 10 is in the retracted position shown in FIG. 1, the pin 204 rests within the first channel 174 disposed between the leading edge 172 and the first tooth 166.

In operation, the container holder 10 is initially in the retracted position shown in FIG. 1 wherein the first, second, and third pivotable arms 14, 16, and 18 are wholly received within the pivotable arm receiving areas 62, 64, and 66 and are therefore flush with an interior surface of the housing.

Figure 5:
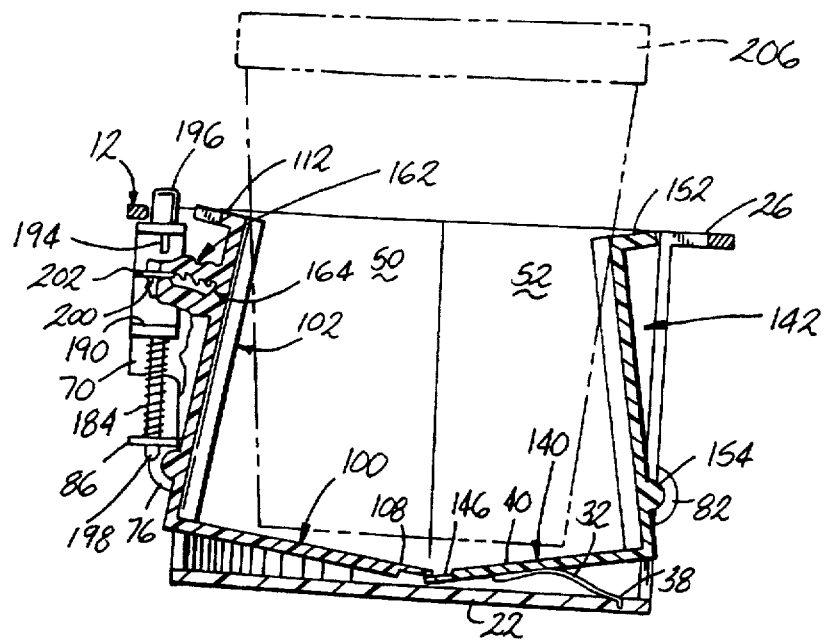
FIG. 5 is a cross-sectional view of the container holder in an extended position taken along lines 4—4 of FIG. 1.
Figure 6:
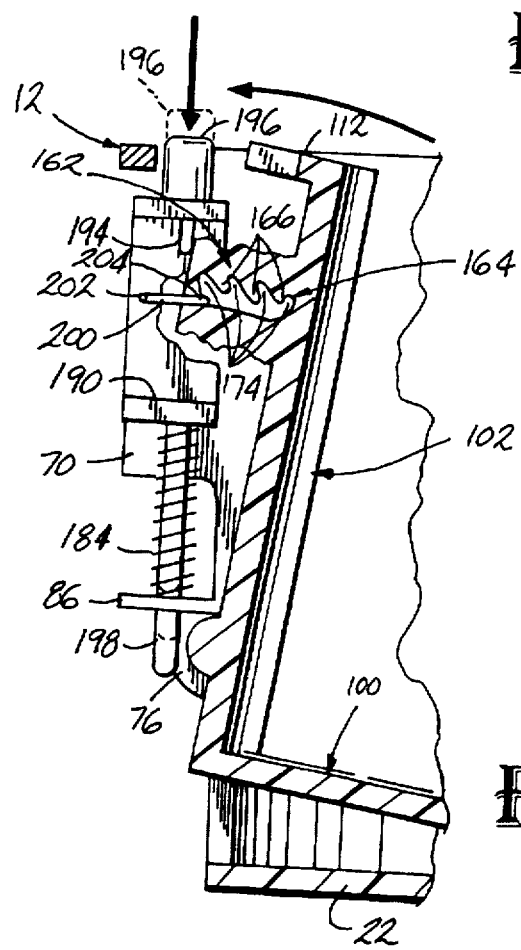
FIG. 6 is a fragmentary cross-sectional view of the container holder of FIG. 1 in an extended position enlarging the region shown in FIG. 5.

A container, such as that shown at 206 in FIG. 5, can be placed into the container holder 10 with the base of the container 206 resting upon the circular area defined by the bases 100, 120, and 140 of the first, second, and third pivotable arms 14, 16, and 18, respectively. The weight of the container 206 causes the pivotable arms 14, 16, and 18 to pivot about their respective mountings. If the weight of the container 206 is sufficient, the container 206 forces the bases 100, 120, and 140 downwardly against the tension of the first and second leaf springs 30 and 32, thereby rotating the first, second, and third pivotable arms 14, 16, and 18 about their respective mountings. If the weight of the container is not sufficient to overcome the spring pressure of springs 30 and 32, the container can be forced downwardly against the spring pressure until the inside edges of the horizontal flanges 112, 132 and 152 contact the sides of the container 206.

The pin 204, initially at rest within the first channel 174 between the leading edge 172 and first tooth 166 of the angular recess 164, is urged vertically by the bias of the spring 184. As the arms 14, 16 and 18 pivot inwardly, the flange 162 moves inwardly and the pin 204 rides along the teeth 166 and into successive channels 174 until the horizontal flanges 112, 132 and 152 contact the side wall of the container 206. The pin 204 will lodge in one of the channels 174 due to the bias of spring 184 and retain all of the arms 14, 16 and 18 in contact with or near the sidewalls of the container 206. Thus, the container holder automatically adjusts to the diameter of the container positioned therein and stays in the extended position even if the container is temporarily removed.

The diametrical dimensions and the spring tensions of the container holder 10 are selected as to accommodate a wide variety of containers of varying volumes. Styrofoam cups, insulated plastic cups and cans of fluid can all be accommodated by the container holder according to the invention.

To return the container holder 10 to its retracted position shown in FIG. 1 after removal of the container 206 from the container holder 10, a user need merely momentarily depress the button 196. As the button 196 is depressed against the bias of the spring 184, the pin 204 is urged out of the channel 174 in which it was lodged, and downwardly until the pin 204 contacts the angular wall 170 of the recess 164. As the pin 204 leaves a channel 174, the first and second leaf springs 30 and 32 force the first, second, and third pivotable arms 14, 16, and 18 to retract fully within the pivotable arm receiving areas 62, 64, and 66 and the pin 204 travels inwardly along the angular wall 170 until the pin 204 reaches the leading edge 172. At this point, the button 196 is released. The upward bias of the spring 184 urges the button assembly 20 upwardly until the pin 204 rests within the first channel located between the leading edge 172 and the first tooth 166. Thus, the container holder 10 is returned to the retracted position as shown in FIG. 1 and is ready to receive an additional container.

While particular embodiments of the invention have been shown, it will be understood, of course, that the invention is not limited thereto since modifications may be made by those skilled in the art, particularly in light of the foregoing teachings. Reasonable variation and modification are possible within the scope of the disclosure of the invention without departing from the spirit of the invention.

The embodiments for which an exclusive property or privilege is claimed are defined as follows:

1. A container holder comprising:

a housing;

multiple arms, each comprising a base portion and an upwardly extending flange;

the multiple arms are each movably mounted to the housing for movement between a retracted position and an extended position;

the multiple arms together at least partially define a container-receiving well;

at least one spring which biases at least one of the multiple arms to the retracted position, the tension in the spring being selected so that the weight of a container positioned in the container-receiving well overcomes the bias of the at least one spring to move the multiple arms from the retracted position toward the extended position.

2. The container holder of claim 1, and further comprising:

a detent mechanism located between the housing and at least one of the multiple arms, the detent mechanism being adapted to selectively retain the multiple arms in the extended position regardless of whether a container is positioned in or removed from the container-receiving well.

3. The container holder of claim 2, and further comprising:

an actuator link movable between a first and a second position, the actuator link being mounted to one of the housing and at least one arm and operably connected to the detent mechanism so that movement of the actuator link to the second position selectively disengages the detent mechanism from the one of the housing and at least one arm.

4. The container holder of claim 3 wherein:

the actuator link comprises a button movably mounted to a flange on the housing and biased into the first position by a spring;

whereby pressing the button moves the actuator link toward the second position to selectively disengage the detent mechanism from one of the housing and the at least one arm.

5. The container holder of claim 1 wherein:

the multiple arms each have an interior surface;

the housing has an interior surface;

whereby the interior surfaces of the multiple arms are flush with the interior surface of the housing when the multiple arms are in the retracted position.

6. The container holder of claim 1 wherein the base portions of the multiple arms have linkages to connect the base portions for movement together.

7. The container holder of claim 1 wherein the base portions and the upwardly-extending flanges of the multiple arms are joined together for movement as a unit.

8. The container holder of claim 1 wherein the housing includes cylindrical wall portions.

9. The container holder of claim 8 wherein the housing further includes an annular lip joined to an upper portion of the cylindrical wall portions.

10. The container holder of claim 1 wherein the base portions of the multiple arms each comprise a circular sector.

11. The container holder of claim 10 wherein the circular sectors of the multiple arms form a circular support plate when the multiple arms are in the retracted position.

12. The container holder of claim 1 wherein the multiple arms are pivotably mounted to a side wall of the housing.

13. The container holder of claim 12 wherein:

the side wall of the housing has mounting flanges with aligned openings;

the multiple arms each have an integral journal;

whereby the integral journal on the multiple arms each snap-fit into the aligned openings on the side wall of the housing to provide a pivotable mounting of each of the multiple arms to the housing.

\* \* \* \* \*